(12) United States Patent
Sela et al.

(10) Patent No.: US 12,253,949 B2
(45) Date of Patent: Mar. 18, 2025

(54) PROCESSING COMMANDS IN A SEQUENTIAL WRITE REQUIRED ZONE MODEL

(71) Applicant: Sandisk Technologies, Inc., Milpitas, CA (US)

(72) Inventors: Rotem Sela, Sunnyvale, CA (US); Amir Segev, Meitar (IL)

(73) Assignee: Sandisk Technologies, Inc., Milpitas, CA (US)

( * ) Notice: Subject to any disclaimer, the term of this patent is extended or adjusted under 35 U.S.C. 154(b) by 99 days.

(21) Appl. No.: 18/359,028

(22) Filed: Jul. 26, 2023

(65) Prior Publication Data

US 2024/0378151 A1 Nov. 14, 2024

Related U.S. Application Data

(60) Provisional application No. 63/501,260, filed on May 10, 2023.

(51) Int. Cl.
*G06F 12/0855* (2016.01)
*G06F 3/06* (2006.01)
*G06F 12/0868* (2016.01)
*G06F 12/10* (2016.01)

(52) U.S. Cl.
CPC ........ *G06F 12/0855* (2013.01); *G06F 3/0659* (2013.01); *G06F 12/0868* (2013.01); *G06F 12/10* (2013.01); *G06F 2212/1016* (2013.01)

(58) Field of Classification Search
None
See application file for complete search history.

(56) References Cited

U.S. PATENT DOCUMENTS

| | | | |
|---|---|---|---|
| 9,760,281 B2 | 9/2017 | Ramalingam | |
| 10,884,658 B2 | 1/2021 | Benisty | |
| 11,269,558 B2 | 3/2022 | Kanno et al. | |
| 11,269,778 B1 | 3/2022 | Kanteti | |
| 2019/0294376 A1* | 9/2019 | Park | G06F 3/064 |
| 2020/0409601 A1 | 12/2020 | Helmick et al. | |
| 2021/0089217 A1 | 3/2021 | Bjørling et al. | |
| 2021/0223994 A1* | 7/2021 | Kanno | G06F 3/0679 |
| 2022/0147283 A1 | 5/2022 | Kanno et al. | |
| 2023/0161500 A1* | 5/2023 | Doucette | G06F 3/0688 711/5 |
| 2024/0111456 A1* | 4/2024 | Chen | G06F 3/0673 |

* cited by examiner

*Primary Examiner* — Kaushikkumar M Patel
(74) *Attorney, Agent, or Firm* — DENTONS Durham Jones Pinegar

(57) ABSTRACT

A data storage device implements a Zoned Namespace (ZNS) storage architecture. The data storage device delays the execution of write commands that are received out of sequence instead of rejecting the write commands. The write commands that are received out of sequence are reordered according to a logical block address (LBA) associated with each write command. The data storage device also checks for deadlock conditions that may arise due to the execution of the write commands being delayed and/or due to the write commands being reordered.

20 Claims, 6 Drawing Sheets

PROCESSING COMMANDS IN A SEQUENTIAL WRITE REQUIRED ZONE MODEL

CROSS-REFERENCE TO RELATED APPLICATIONS

The present application claims priority to U.S. Provisional Application 63/501,260 entitled "PROCESSING COMMANDS IN A SEQUENTIAL WRITE REQUIRED ZONE MODEL", filed May 10, 2023, the entire disclosure of which is hereby incorporated by reference in its entirety.

BACKGROUND

In a Zoned Namespace (ZNS) storage architecture, a storage device is divided into multiple zones with each zone containing a contiguous range of logical block addresses (LBAs). In such an architecture, a host device is required to write data to the storage device in a sequential manner.

In order to obtain and maintain maximum performance of the storage device, the host device typically sends multiple commands (e.g., write commands) to the storage device. However, it is difficult to maintain the sequential order of the commands. For example, data transfer errors and/or race conditions in queues of the host device may cause the commands to arrive at a controller associated with the storage device out of sequence. If any of the commands arrive out of order, the commands are rejected. Rejecting commands causes the storage device to be inefficient.

Accordingly, it would be beneficial for a storage device to have a process whereby write commands that are received out of sequence are analyzed to determine whether execution of the write commands may be delayed and/or reordered instead of rejected.

SUMMARY

The present application describes a data storage device that implements a Zoned Namespace (ZNS) storage architecture. The data storage device described herein includes a number of systems and executes various operations that delay the execution/completion of received write commands, instead of rejecting the write commands, that are received out of order. In an example, the data storage device reorders the delayed write commands according to a logical block address (LBA) associated with each write command. Additionally, the various systems and operations described herein check for deadlock conditions that may arise due to the execution of the write commands being delayed and/or reordered.

Accordingly, the present application describes a method that includes receiving, from a host device, a sequential zone storage write command. A determination is made, based at least in part, on a LBA associated with the sequential storage write command, whether the sequential zone storage write command was received in sequence with respect to a previously received sequential zone storage write command. Based, at least in part, on determining the sequential zone storage write command was received out of sequence with respect to the previously received sequential zone storage write command, a determination is made as to an amount of memory needed to store data associated with the sequential zone storage write command and an amount of memory needed to store data associated with one or more intervening sequential zone storage write commands. In an example, the one or more intervening sequential zone storage write commands fall in sequence between the sequential storage write command and the previously received sequential zone storage write command. A determination may also be made as to whether a write cache has sufficient memory to store the amount of data associated with the sequential zone storage write command and the amount of data associated with the one or more intervening sequential zone storage write commands. Based, at least in part, on determining the write cache has sufficient memory, a determination is made as to whether a command completion counter is less than a command queue threshold. Based, at least in part, on determining the command completion counter is less than the command queue threshold, the data associated with the sequential zone storage write command is stored in the write cache.

Also described is a system that includes a controller, a sequential write required storage device and a memory communicatively coupled to the controller. The memory stores instructions that, when executed by the controller, cause the controller to perform various operations. For example, the controller determines, based at least in part, on a LBA associated with a received sequential zone storage write command, whether the sequential zone storage write command was received in sequence with respect to a previously received sequential zone storage write command. If it is determined that the sequential zone storage write command was received out of sequence with respect to the previously received sequential zone storage write command, the controller determines whether a write cache has sufficient memory to store a determined amount of data associated with the sequential zone storage write command and a determined amount of data associated with one or more intervening sequential zone storage write commands. If it is determined that the write cache has sufficient memory, the controller may further determine whether a command completion counter is less than a command queue threshold. If the command completion counter is less than the command queue threshold, the controller causes the data associated with the sequential zone storage write command to be stored in the write cache.

The present application also describes a system that includes a controller means and a sequential write required storage means. The system also includes means for determining whether a sequential zone storage write command was received in sequence with respect to a previously received sequential zone storage write command. Based, at least in part, on a determination that the sequential zone storage write command was received out of sequence with respect to the previously received sequential zone storage write command, the system includes means for determining whether a write cache has an amount of memory to store a determined amount of data associated with the sequential zone storage write command and a determined amount of data associated with one or more intervening sequential zone storage write commands. The system also includes means for determining whether a command completion counter is less than a command queue threshold. The system may also include means for causing the data associated with the sequential zone storage write command to be stored in the write cache based, at least in part, on determining the command completion counter is less than the command queue threshold and based, at least in part, on determining the write cache has sufficient memory.

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

BRIEF DESCRIPTION OF THE DRAWINGS

Non-limiting and non-exhaustive examples are described with reference to the following Figures.

DETAILED DESCRIPTION

Figure 1:
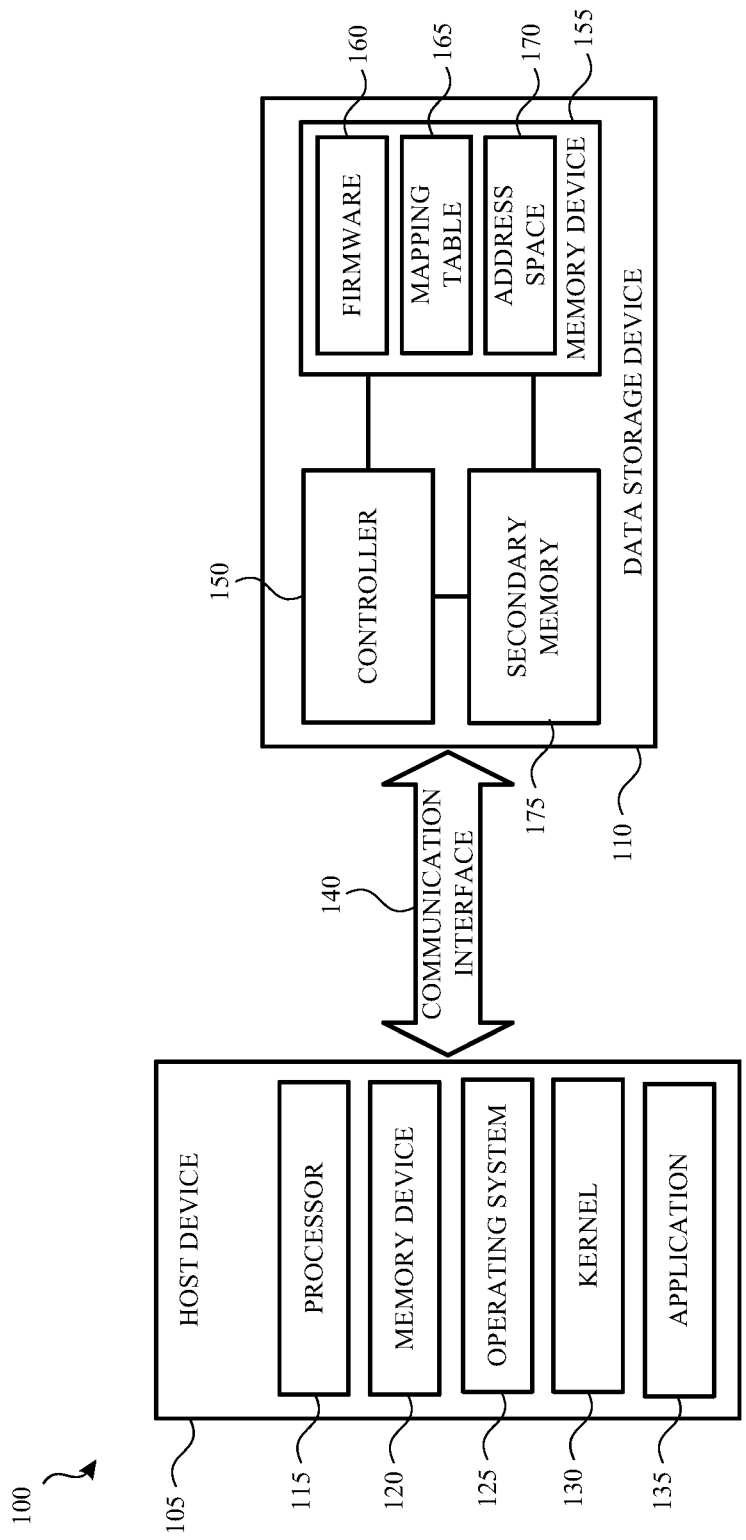
FIG. 1 is a block diagram of a system that may be used to execute the various processes described herein according to an example.

In the following detailed description, references are made to the accompanying drawings that form a part hereof, and in which are shown by way of illustrations specific embodiments or examples. These aspects may be combined, other aspects may be utilized, and structural changes may be made without departing from the present disclosure. The following detailed description is therefore not to be taken in a limiting sense, and the scope of the present disclosure is defined by the appended claims and their equivalents.

Examples described herein are directed to Sequential Write Required (SWR) commands that are received for Zoned Namespace (ZNS) storage architectures. As previously explained, in a ZNS storage architecture, a storage device is divided into multiple zones with each zone containing a contiguous range of logical block addresses (LBAs). In the ZNS storage architecture, a host device is required to write data to a storage device in a sequential manner.

However, the host device typically sends multiple commands (e.g., write commands) to the storage device. Additionally, data transfer errors and/or race conditions in queues of the host device may cause the write commands to arrive at a controller associated with the storage device out of order. If any of the write commands arrive out of order, the write commands are typically rejected. For example, if an LBA associated with a received write command does not match an expected write pointer value of a particular zone (e.g., a location in the zone at which a next sequential LBA is expected), the write command is rejected. Additionally, some or all of the write commands in a memory device queue may also be considered to be out of order and may be subsequently rejected.

However, instead of rejecting the write commands if they are received out of order, the present application describes a process that delays the completion of the write commands and/or reorders the write commands instead of returning an error and/or rejecting the write commands. As will be explained, the write commands are reordered based, at least in part, on their LBAs.

For example, if a LBA of a received write command is equivalent to an expected LBA (e.g., the write command is received in sequence), the write command may be provided to a write cache and subsequently written to a memory device. However, if the LBA of the write command is not equivalent to the expected LBA, the write cache management system may determine whether there is sufficient memory in the write cache to store data associated with the received write command and to store data associated with any intervening write command that falls in sequence between the expected write command (e.g., a write command having the expected LBA) and the received write command.

Additionally, the write cache management system may determine whether a command queue has sufficient room to store the received write command as well as any intervening write commands that would need to be received and executed prior to the received write command being executed. If either of these conditions is not met, the write command is completed with a retry request which allows the host device to resend the write command.

As additional write commands are received, various operations are performed to determine if and/or when the additional write commands and/or the write commands that are stored in the command queue may be provided to the write cache and subsequently written to the memory device, thereby freeing up memory in the write cache and potentially enabling additional write commands to be stored in the command queue.

In accordance with the above, many technical benefits may be realized including, but not limited to, increasing the efficiency of a storage device by enabling the storage device to reorder, instead of reject, write commands that are received out of sequence and improving the reliability of the storage device by avoiding situations that can cause deadlock conditions.

These benefits and other examples will be shown and described in greater detail with respect to FIG. 1-FIG. 7.

FIG. 1 is a block diagram of a system 100 that includes a host device 105 and a data storage device 110 according to an example. In an example, the host device 105 includes a processor 115 and a memory device 120 (e.g., main memory). The memory device 120 may include an operating system 125, a kernel 130 and/or an application 135.

The processor 115 can execute various instructions, such as, for example, instructions from the operating system 125 and/or the application 135. The processor 115 may include circuitry such as a microcontroller, a Digital Signal Processor (DSP), an Application-Specific Integrated Circuit (ASIC), a Field Programmable Gate Array (FPGA), hard-wired logic, analog circuitry and/or various combinations thereof. In an example, the processor 115 may include a System on a Chip (SoC).

In an example, the memory device 120 stores data used by the processor 115. Data stored in the memory device 120 may include instructions provided by/to the data storage device 110 via a communication interface 140. The data stored in the memory device 120 may also include data used to execute instructions from the operating system 125 and/or one or more applications 135. In an example, the memory 120 is volatile memory, such as, for example, Dynamic Random Access Memory (DRAM).

In an example, the operating system 125 may create a virtual address space for the application 135 and/or other processes executed by the processor 115. The virtual address space may map to locations in the memory device 120. The operating system 125 may include or otherwise be associated with a kernel 130. The kernel 130 may include instructions for managing various resources of the host device 105 (e.g., memory allocation), handling read and write requests and so on.

The communication interface 140 communicatively couples the host device 105 and the data storage device 110. The communication interface 140 may be a Serial Advanced Technology Attachment (SATA), a PCI express (PCIe) bus, a Small Computer System Interface (SCSI), a Serial Attached SCSI (SAS), Ethernet, Fibre Channel, or WiFi. As such, the host device 105 and the data storage device 110 need not be physically co-located and may communicate over a network such as a Local Area Network (LAN) or a Wide Area Network (WAN), such as the internet. In addition, the host device 105 may interface with the data storage device 110 using a logical interface specification such as, but not limited to, Non-Volatile Memory express (NVMe), Universal Flash Storage (UFS) or Advanced Host Controller Interface (AHCI).

The data storage device 110 may implement a Zoned Namespace (ZNS) storage architecture. As such, the data storage device 110 may be divided into multiple zones with each zone containing a contiguous range of logical block addresses (LBAs). In such an example, the host device 105 may be required to write data to the data storage device 110 in a sequential manner.

The data storage device 110 includes a controller 150 and a memory device 155 (e.g. volatile and/or non-volatile memory). The memory device 155 (and/or portions of the memory device 155) may also be referred to as a storage medium. The memory device 155 includes a number of storage elements. In an example, each storage element is a chip or a memory die that is used to store data.

For example, the memory device 155 may include a first memory die and a second memory die. In an example, the first memory die and the second memory die include non-volatile memory elements such as, for example, NAND flash memory elements and/or NOR flash memory elements. Although two memory dies are mentioned, the memory device 155 may include any number of storage elements. For example, the storage elements may take the form of solid-state memory such as, for example, 2D NAND, 3D NAND memory, multi-level cell memory, triple level cell memory, quad-level cell memory, penta-level cell memory or any combination thereof. Additionally, each memory die may be divided into one or more zones. As indicated above, a zone is a contiguous range of LBAs that may store data.

The controller 150 may include circuitry for executing instructions. The instructions may originate from firmware 160 associated with the data storage device 110. In another example, the instructions may originate from the host device 105. Accordingly, the controller 150 may include circuitry such as one or more processors, a microcontroller, a DSP, an ASIC, an FPGA, hard-wired logic, analog circuitry and/or a combination thereof. In another example, the controller 150 may include a SoC.

The data storage device 110 may also include secondary memory 175. The secondary memory 175 may be a rotating magnetic disk or non-volatile solid-state memory, such as flash memory. While the description herein refers to solid-state memory generally, it is understood that solid-state memory may comprise one or more of various types of memory devices such as flash integrated circuits, NAND memory (e.g., single-level cell (SLC) memory, multi-level cell (MLC) memory (i.e., two or more levels), or any combination thereof), NOR memory, EEPROM, other discrete Non-Volatile Memory (NVM) chips, or any combination thereof.

In some examples, the memory device 155 is capable of storing data at a byte-addressable level, as opposed to other types of non-volatile memory that have a smallest writable data size such as a page size of 4 KB or a sector size of 512 Bytes.

In some examples, the memory device 155 may also store a mapping table 165 and/or an address space 170. In some examples, the controller 150 can associate portions of data stored in the secondary memory 175 with unique identifiers. The unique identifiers may be stored in the memory device 155 and be used by the operating system 125 to access stored data. For example, the mapping table 165 can provide a mapping of unique identifiers with indications of physical locations (e.g., Physical Block Addresses (PBAs)) where the corresponding portions of data are stored in the memory device 155 and/or the secondary memory 175.

In some examples, the firmware 160 may store, maintain, be associated with or otherwise have access to a mapping table (e.g., mapping table 165) that stores and/or maintains the updated programming order of memory dies for specific memory blocks.

As briefly discussed above, the memory device 155 may also include address space 170. The address space 170 can serve as at least a portion of an address space used by the processor 115. In an example, the address space 170 can store data at a byte-addressable level that can be accessed by the processor 115 (e.g., via the communication interface 140).

For example, the data storage device 110 may provide the host device 105 with an indication of the address space 170. The host device 105 may then associate an address range for the address space 170 and an indication that this address range is to be used as a byte-addressable address space, such as for a page cache.

In another example, the host device 105 may manage the data storage device 110 such that the processor 115 can directly access address space 170. For example, the data storage device 110 may provide logical to physical address translation information to the host device 105, which can be called by the host device 105 and executed by the processor 115 and/or the controller 150. In some examples, the controller 150 may include or otherwise be associated with a flash translation layer (FTL). The FTL may map the logical block addresses to the physical addresses of the memory device 155.

Although FIG. 1 illustrates the host device 105 being separate from the data storage device 110, the host device 105 and the data storage device 110, as well the various components described, may be part of a single device or part of multiple devices.

Figure 2:
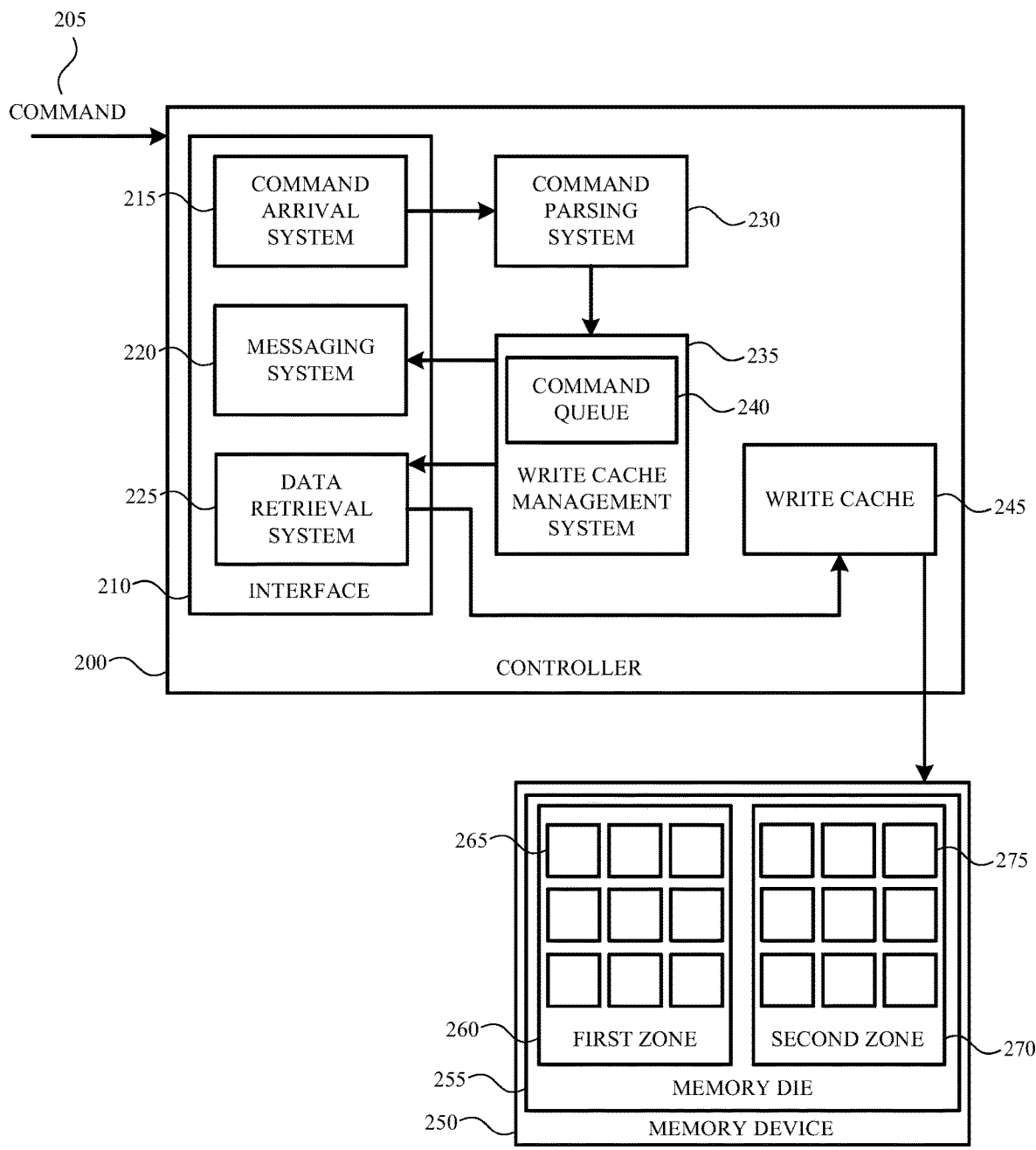
FIG. 2 is a block diagram of a controller and an associated memory device that may be used to reorder sequential zone storage write commands that are received out of sequence according to an example.

FIG. 2 is a block diagram of a controller 200 and an associated memory device 250 that may be used to reorder sequential zone storage write commands that are received out of sequence according to an example. In an example, the controller 200 may be similar to the controller 150 shown and described with respect to FIG. 1. Likewise, the memory device 250 may be similar to the memory device 155 shown and described with respect to FIG. 1. Additionally, the controller 200 and the memory device 250 may be configured to implement a ZNS storage architecture such as previously described.

The controller 200 includes an interface 210 that communicatively couples the controller 200 to a host device (e.g., host device 105 (FIG. 1)). In an example, the interface 210 is a high-speed interface such as, for example, a Universal Flash Storage (UFS) interface. As such, the memory device 250 may be, or may be part of, a solid-state storage device (SSD) or an enterprise SSD (eSSD). Although a specific interface and data storage devices are mentioned, other interfaces and data storage devices may be used.

In an example, the interface 210 includes a command arrival system 215, a messaging system 220 and a data retrieval system 225. Each of these systems will be discussed in greater detail herein. The controller 200 may also include a command parsing system 230, a write cache management system 235 and a write cache 245. In an example, the write cache management system 235 may include a command queue 240.

The controller 200 may be communicatively coupled to a memory device 250. The memory device 250 may be a NAND memory device and may include a memory die 255. Although a single memory die 255 is shown, the memory device 250 may include multiple memory dies. Additionally, the memory die 255 is divided into multiple zones (e.g., a first zone 260 and a second zone 270). Although two zones are shown, the memory die 255 may include any number of zones. Further, each zone may be divided into one or more blocks 265. For example, the first zone 260 may have a first sequence of blocks 265 and the second zone 270 may have a second sequence of blocks 275. In an example, each zone may be provided on a same plane of the memory die 255 or on separate planes of the memory die 255. In another example, a zone may extend across multiple dies.

The blocks may be physical memory blocks that relate to groups of physical memory cells. As used herein, a logical memory block is a virtual unit of address space defined to have the same size as a physical memory block. Each logical memory block includes a range of logical memory block addresses (LBAs) that are associated with data received from the host device. The LBAs may be mapped to one or more blocks of the first sequence of blocks 265 and/or the second sequence of blocks 275.

In an example, the controller 200 is configured to reorder received sequential zone storage write commands (also referred to as "commands" or "write commands") that are received out of sequence. The controller 200 is also configured to detect and avoid any deadlock conditions that may arise as a result of the commands being reordered.

The controller 200 may receive, via the command arrival system 215 of the interface 210, a command 205 from a host device. Based on receiving the command 205, the command arrival system 215 provides the command 205 to a command parsing system 230. The command parsing system 230 may determine various properties and/or features of the command 205. For example, the command parsing system 230 may determine whether the command 205 is a write command, a read command or another type of command (e.g., an administration command).

If the command 205 is a write command, the command 205 is provided to the write cache management system 235. The write cache management system 235 may also determine various properties and/or features associated with the command 205. These properties and/or features of the command 235 may include a LBA (or range of LBAs) associated with the command 205 and amount of data that is to be written to the memory device 250.

The write cache management system 235 may also determine based, at least in part, on the LBA associated with the command 205, whether the command 205 may be executed, whether the command 205 should and/or can be stored in the command queue 240, and/or whether a retry request should be communicated to the host device. In the examples that follow, each of these scenarios will be explained as various commands 205 are received-both in sequence and out of sequence.

The write cache management system 235 may track one or more pointers (e.g., a write pointer) and/or other information that indicate or otherwise specify a LBA of a particular zone (e.g., the first zone 260 or the second zone 270) of the memory die 255 at which sequential write operations are to be performed, how much memory is needed to store and subsequently execute commands that are received out of sequence and whether there is sufficient room in the command queue 240 to store the commands 205 that are received out of sequence. In the examples that follow, these are referred to as the "head_zone" and the "high_zone".

In an example, the high_zone or a value of the high_zone, refers to a highest LBA that is associated with a received command that has not yet been executed. The head_zone refers to a LBA in a particular zone of the memory die 255 at which sequential data is to be written. In the following examples, the high_zone and the head_zone are each initialized to a starting value (e.g., 0) and will be updated as various commands 205 are received.

In the examples that follow, the host device sends a number of different commands 205 to the controller 200. Specifically, in these examples, the controller 200 will receive four different commands 205 from the host device-Command A, Command B, Command C and Command D. Some of the commands 205 will be received in sequence while other commands 205 are received out of sequence. Additionally, each of the commands 205 may be associated with data having the same size or different sizes (e.g., consume the same amount of blocks in the various zones of the memory die 255 or consume a different amount of blocks in the various zones of the memory die 255).

In the current example, Command A is first command 205 received by the controller 200. When Command A is received, the command parsing system 230 may provide Command A to the write cache management system 235. The write cache management system 235 determines, based on an LBA associated with Command A, that data associated with Command A is to be written in memory blocks 0-9 of the first zone 260 of the memory die 255.

The write cache management system 235 may then compare the LBA of Command A to high_zone to determine whether the LBA of Command A is less than or equal to high_zone. In this example, high_zone is initially set to 0. Further, the starting LBA of Command A is 0. Because the LBA of Command A is equal to (or less than) high_zone, the write cache management system 235 causes the data retrieval system 225 to fetch the data associated with Command A. The fetched data may then be stored in its proper location (e.g., a location in the write cache 245 that corresponds with memory blocks 0-9 in the first zone 260 of the memory die 255) within the write cache 245.

Once the data associated with Command A has been written to or otherwise provided to the write cache 245, the write cache management system 235 may determine an amount of free memory that is still available in the write cache 245. For example, if the write cache 245 can hold X amount of data and Command A has Y amount of data, the remaining amount of free memory in the write cache 245 is X-Y.

The write cache management system 235 may then determine whether a command completion message may be provided to the host device. In order to make this determination, the write cache management system 235 determines whether the LBA of Command A is equivalent to head_zone. As indicated above, head_zone is initially 0 and the LBA of Command A is 0. Accordingly, the write cache management system 235 may cause the messaging system 220 to submit a command completion message to the host device indicating that Command A was successfully completed.

The write cache management system 235 may also update head_zone to be equivalent to the size of the command that was successfully executed. In the example above, the size of Command A is ten (e.g., data associated with Command A consumed blocks 0-9). As such, head_zone is now equivalent to ten.

The write cache management system 235 may then cause the data stored in the write cache 245 associated with Command A to be written in the corresponding memory location with the memory die 255 of the memory device 250. The write cache management system 235 may also update the amount of memory that is available in the write cache 245. In an example, updating the amount of available memory in the write cache is based on the amount of data (or command size) associated with the command 205 that was successfully executed (e.g., Command A).

Continuing with the example above, when data associated with Command A was written to the write cache 245, the remaining amount of memory in the write cache 245 was X-Y. Because Y amount of data was transferred from the write cache 245 to the memory device 250, the write cache 245 has X amount of space available (e.g., (X-Y)+Y).

The write cache management system 235 may also determine whether there are any other commands 205 in the command queue 240 that can be executed (e.g., data associated with the commands 205 in the command queue 240 can be written to the write cache 245 and/or the memory device 250). Specifically, the write cache management system 235 may determine whether an LBA of a command 205 that was received out of sequence and stored in the command queue 240 matches the updated head_zone. Currently, in this example, the command queue 240 does not include any commands 205. As such, the controller 200 may begin parsing another command 205.

The controller 200 may now receive Command D from the host device. In this example, Command D has an LBA of 51. Additionally, data associated with Command D will be written in memory blocks 51-70 of the first zone 260 of the memory die 255.

When Command D is received first by the interface 210, Command D is subsequently provided to the write cache management system 235. The write cache management system 235 may determine, based on the LBA associated with Command D, that data associated with Command D is to be written in blocks 51-70 of the first zone 260 of the memory die 255.

The write cache management system 235 compares the LBA of Command D to high_zone to determine whether the LBA of Command D is less than or equal to high_zone. As indicated above, in this example, the value of high_zone is still 0. Because the LBA of Command D is greater than high_zone, the write cache management system 235 determines whether the execution of Command D can be delayed and subsequently reordered or if a deadlock condition will occur. If a deadlock condition will occur when attempting to reorder Command D, the write cache management system 235 will reject Command D. Additionally, the write cache management system may cause the messaging system 220 to provide or submit a retry request (a request that indicates the host device should resend Command D) to the host device.

For example, the write cache management system 235 may determine an amount of memory that is needed or required to store all of the data associated with Command D. Additionally, the write cache management system 235 may also determine an amount of memory that is needed or required to store all of the data associated with any intervening commands (e.g., all of the data associated with Command B and all of the data associated with Command C) that are received after Command D but fall in sequence with a previously executed command (e.g., Command A). This determination may be based, at least in part, on a size of each logical block and remaining memory in the write cache 245.

For example, the write cache management system 235 may determine that each logical block is n kilobytes (KB). As indicated above, data associated with Command D will require twenty logical blocks (e.g., memory blocks 51-70). Additionally, data associated with Command B and Command C will require an additional forty-one memory blocks (e.g., memory blocks 10-50). Accordingly, the write cache 245 should have n*61 KB of space available in order to store all data associated with Command D, Command B and Command C. If the write cache management system 235 determines the write cache 245 does not have the necessary memory space, the write cache management system 235 rejects Command D. Additionally, the write cache management system 235 may also cause the messaging system 220 to communicate a retry request to the host device.

However, if the write cache management system 235 determines the write cache 245 has the necessary memory space to store all of the data associated with Command D, Command B and Command C, the write cache management system 235 may also determine whether a number of commands (referred to herein as a "command completion counter") in the command queue 240 exceeds a command queue threshold. In an example, the command completion counter is incremented each time execution of a received command 205 is delayed and/or subsequently reordered. Additionally, the command queue threshold may be less than (e.g., at least one less than) a total number of commands that may be stored in a command pipeline associated with the host device.

For example, if the command pipeline of the host device can store one-hundred commands, the command queue 240 may store up to ninety-nine commands. This helps avoid a deadlock condition in which a command 205 that is next in a sequence of commands to be executed might be blocked because commands queue 240 is already full. (or in this example, is the one-hundred first command received) by the controller 200.

Returning back to the example, if the write cache management system 235 determines the command completion counter is greater than or equal to the command queue threshold, the write cache management system 235 rejects Command D and causes the messaging system 220 to provide a retry request to the host device. However, if the write cache management system 235 determines that the command completion counter is less than the command queue threshold, the write cache management system 235 causes the data retrieval system 225 to fetch the data associated with Command D. The data associated with Command D is then stored in its proper location in the write cache 245 (e.g., a location in the write cache 245 that corresponds with memory blocks 51-70 in the first zone 260 of the memory die 255).

Once the data associated with Command D has been provided in the write cache 245, the write cache management system 235 may determine an amount of free memory that is still available in the write cache 245. For example and as previously described, the write cache 245 can hold X amount of data. Additionally, Command D has Z amount of data. As such, the remaining amount of free memory in the write cache 245 is X-Z.

The write cache management system 235 may then determine whether a command completion message may be provided to the host device. As previously discussed, in order to make this determination, the write cache management system 235 determines whether the LBA of Command D is equivalent to head_zone. In the previous iteration of this example, head_zone was updated based on Command A being completed/executed. As such, the value for head_zone is now 10. Because the LBA of Command D is 51 and 51 is not equivalent to 10, the data in the write cache 245 cannot be written to the memory device 250 as it would be written out of sequence.

Based on this determination, the write cache management system 235 updates the command queue 240 and the command completion counter. In order to update the command queue 240 and the command completion counter, the write cache management system 235 compares the LBA of Command D to high_zone. As previously indicated, the value of high_zone is 0. Because the LBA of Command D is greater than high_zone, the write cache management system 235 updates the value of high_zone. In an example, the value of high_zone is updated based on the LBA of Command D (e.g., 51) plus the size of Command D (e.g., 20-because Command D will consume memory blocks 51-70) minus 1.

Once high_zone is updated, the write cache management system 235 pushes or otherwise stores Command D 240 in the command queue 240. Additionally, write cache management system 235 causes the command completion counter to be incremented.

The controller 200 may now receive Command C from the host device in a manner similar to the other commands 205 that were received. In this example, Command C has an LBA of 41 and data associated with Command C will be written in memory blocks 41-50 of the first zone 260 of the memory die 255.

The write cache management system 235 compares the LBA of Command C to high_zone to determine whether the LBA of Command C is less than or equal to high_zone. As indicated above with respect to the example associated with Command D, high_zone is equivalent to LBA 70. Because the LBA of Command C (e.g., LBA 41) is less than high_zone, the write cache management system 235 may not need to determine whether reordering/delaying execution of Command C will cause a deadlock condition because it was already determined that reordering/delaying execution of Command D, and any intermediate commands, such as Command C, would not cause a deadlock condition due to the memory range.

However, the write cache management system 235 may need to determine whether a command completion counter exceeds a command queue threshold. This helps ensure that a deadlock condition will not occur due to the number of completed commands. For example, if the write cache management system 235 determines the command completion counter is greater than or equal to the command queue threshold, the write cache management system 235 rejects Command C and causes the messaging system 220 to provide a retry request to the host device. However, if the write cache management system 235 determines that the command completion counter is less than the command queue threshold, data associated with Command C may be provided to the write cache 245.

For example, because the LBA of Command C is less than high_zone, there is sufficient memory to write the data associated with Command C and the command completion counter is less than command completion counter, the write cache management system 235 causes the data retrieval system 225 to fetch the data associated with Command C. The data associated with Command C is then stored in its proper location in the write cache 245. (e.g., a location in the write cache 245 that corresponds with memory blocks 41-50 in the first zone 260 of the memory die 255). Once the data associated with Command C has been provided in the write cache 245, the write cache management system 235 may determine an amount of free memory that is still available in the write cache 245 such as previously described.

The write cache management system 235 may then determine whether a command completion message may be provided to the host device. As previously discussed, in order to make this determination, the write cache management system 235 determines whether the LBA of Command C is equivalent to head_zone. In the example above, the value for head_zone is 10. Because the LBA of Command C is 41 and 41 is not equivalent to 10, the data in the write cache cannot be written to the memory device 250. As such, a command completion message is not sent to the host device.

Based on this determination, the write cache management system 235 may need to update the command queue 240 and the command completion counter such as described with respect to Command D. In order to update the command queue 240 and the command completion counter, the write cache management system 235 compares the LBA of Command C to high_zone. As previously indicated, the value of high_zone is 70. Because the LBA of Command C is not greater than high_zone, the write cache management system 235 pushes, or otherwise stores, Command C in the command queue 240. Additionally, the write cache management system 235 causes the command completion counter to be incremented.

The controller 200 may now receive Command B from the host device in a manner that is similar to the other commands 205 that were received. In this example, Command B has an LBA of 10. Additionally, data associated with Command B will be written in memory blocks 10-40 of the first zone 260 of the memory die 255.

The write cache management system 235 compares the LBA of Command B to high_zone to determine whether the LBA of Command B is less than or equal to high_zone. As indicated above, high_zone is equivalent to LBA 70. Because the LBA of Command B (e.g., LBA 10) is less than high_zone, the write cache management system 235 does not need to determine whether reordering of Command B will cause a deadlock condition.

However, the write cache management system 235 may need to determine whether a command completion counter exceeds a command queue threshold such as previously described to ensure a deadlock condition will not be triggered if execution of Command B is delayed. For example, the write cache management system 235 determines whether the command completion counter is greater than or equal to the command queue threshold. If so, the write cache management system 235 rejects Command B and causes the messaging system 220 to provide a retry request to the host device. However, if the write cache management system 235 determines that the command completion counter is less than the command queue threshold, data associated with Command B may be provided to the write cache 245.

In this example, the command completion counter is 2 because Command D and Command C have been "completed" or reordered and stored in the command queue 240. Further, in this example, the command completion counter is less than the command queue threshold.

Accordingly, the write cache management system 235 causes the data retrieval system 225 to fetch the data associated with Command B. The data associated with Command B may then be stored in its proper location in the write cache 245 (e.g., a location in the write cache 245 that corresponds with memory blocks 10-40 in the first zone 260 of the memory die 255). Once the data associated with Command B has been provided in the write cache 245, the write cache management system 235 may determine an amount of free memory that is still available in the write cache 245 such as previously described.

The write cache management system 235 may then determine whether a command completion message may be provided to the host device. As previously discussed, in order to make this determination, the write cache management system 235 determines whether the LBA of Command B is equivalent to head_zone. As previously indicated, the value for head_zone is 10. Additionally, the LBA of Command B is 10. Accordingly, the write cache management system 235 may cause the messaging system 220 to submit a command completion message to the host device indicating that Command B was successfully completed.

The write cache management system 235 may also update head_zone to be equivalent to the size of the command that was successfully executed. In the example above, the size of Command B is thirty-one (e.g., data associated with Command B consumed memory blocks 10-40 of the first zone 260 of the memory die 255). As such, head_zone is now equivalent to 41.

The write cache management system 235 may then cause the data stored in the write cache 245 associated with Command B, Command C, and Command D to be written to the corresponding memory location within the first zone 260 of the memory die 255 of the memory device 250. When the data associated with Command B, Command C and Command D has been written to or otherwise provided to memory device 250, the write cache management system 235 may determine an amount of free memory that is available in the write cache 245 such as previously described.

The write cache management system 235 may also determine whether there are any commands in the command queue 240 for which a completion message may be transmitted to the host device and/or whether data associated with any received commands 205 can be written in the write cache 245. For example, the write cache management system 235 determines whether an LBA of a command 205 that was received out of sequence and stored in the command queue 235 matches the updated head_zone.

In this example, the command queue 240 includes Command C and Command D (even though the data for these commands was already written to the memory device 250. As indicated above, Command C has an LBA of 41. As also indicated above, head_zone has a value of 41. Accordingly, the write cache management system 235 removes Command C from the command queue 240 and decrements/updates the command completion counter. The write cache management system 235 also causes the messaging system 220 to send a command completion message to the host device with respect to Command C. The write cache management system may also cause head_zone to be updated such as previously described. For example, head_zone will now have a value of 51.

The write cache management system 235 may continue to repeat this process for all remaining commands 205 in the command queue 240. For example, Command D is still in the command queue 240. As indicated above, Command D has an LBA of 51. As also indicated above, head_zone also has a value of 51. Accordingly, the write cache management system 235 removes Command D from the command queue 240, decrements the command completion counter, causes the messaging system 220 to send a command completion message to the host device with respect to Command D and updates the value of head_zone such as previously described.

Figure 3:
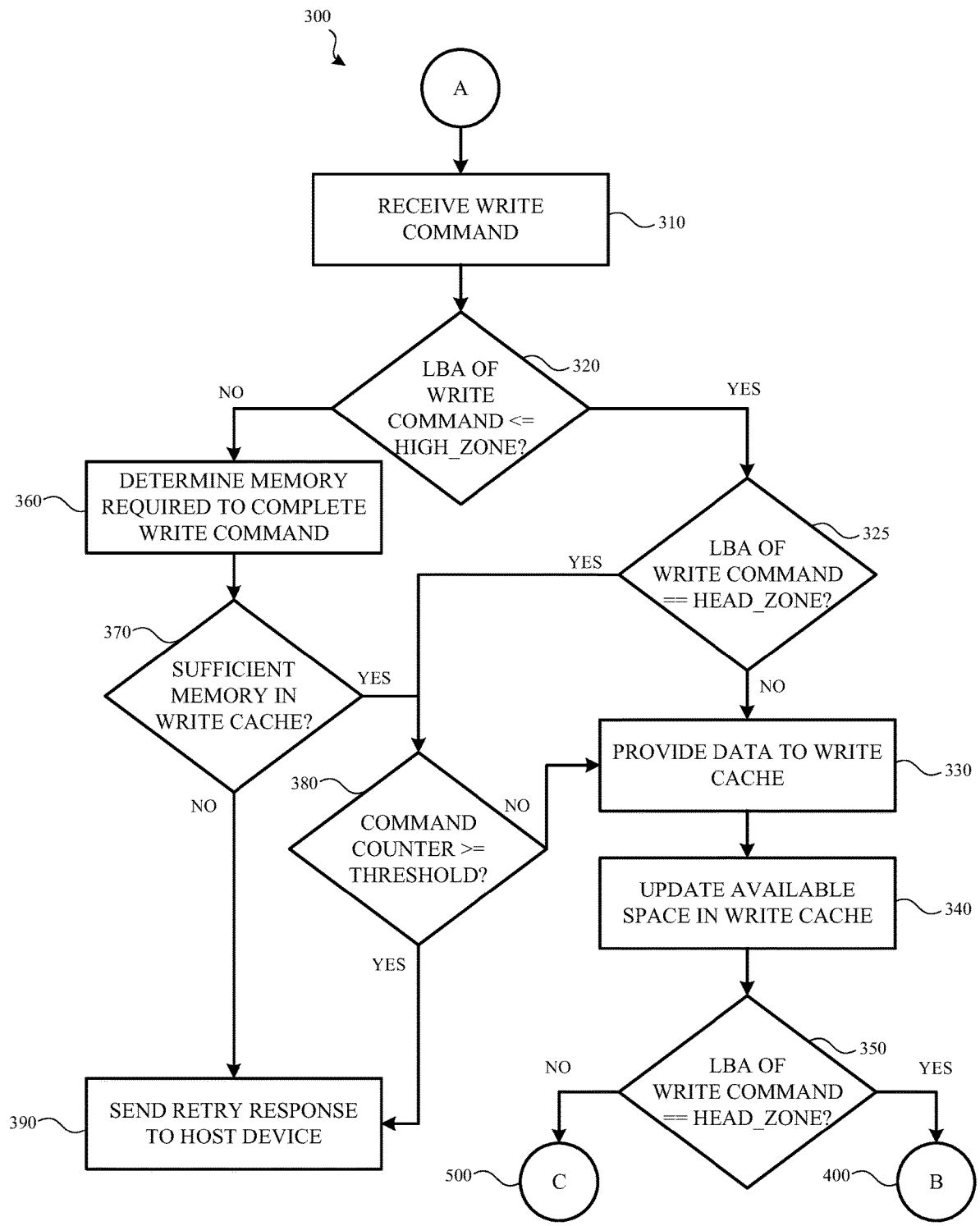
FIG. 3 illustrates a method for avoiding a deadlock condition when reordering sequential zone storage write commands according to an example.

FIG. 3 illustrates a method 300 for avoiding a deadlock condition when reordering sequential zone storage write commands according to an example. In an example, the method 300 may be executed or otherwise performed by a controller, such as, for example, controller 200 (FIG. 2) and/or by one or more subsystems of the controller 200.

Method 300 begins when a write command is received (310) by the controller. In an example, the write command is a sequential zone storage write command received from a host device (e.g., host device 105 (FIG. 1)). Based on receiving the write command, the controller may determine (320) whether a LBA of the received write command is less than or equal to high_zone (e.g., a highest LBA that is associated with a received command that has not yet been executed). In an example, the comparison between the LBA of the received write command and high_zone is used to determine whether the received write command was received out of sequence.

If the controller determines (320) that the LBA of the received write command is less than or equal to high_zone (e.g., the write command was not received out of sequence), the controller may also determine (325) whether the LBA of the write command is equivalent to a head_zone value. In an example, head_zone is an LBA of a particular zone of a memory die at which sequential data is to be written. For example, the head_zone or the head_zone value indicates an expected or required LBA of data that is to be sequentially written to a particular memory zone. If it is determined (325) that the LBA of the received write command is not equivalent to the head_zone value, data associated with the write command is provided (330) to a write cache (e.g., write cache 245 (FIG. 2)) associated with the controller. Based on data being received by the write cache, the controller may also determine or otherwise update (340), based at least in part, on an amount of data associated with the write command, an amount of available space remaining in the write cache.

The controller may also make another determination (350) as to whether the LBA of the write command is equivalent to the head_zone value. If the controller determines (350) the LBA of the write command is equivalent to head_zone value, the controller executes the method 400 shown and described with respect to FIG. 4. However, if the controller determines (350) the LBA of the write command is not equivalent to head_zone, the controller executes the method 500 shown and described with respect to FIG. 5. Each of these methods will be described in greater detail herein.

Referring back, to operation 325, if the controller determines (325) that the LBA of the received write command is equivalent to the head_zone value, the controller may also determine (380) whether a number of commands (referred to herein as a command completion counter) in a command queue exceeds a command queue threshold. In an example, the command completion counter is incremented each time execution of a received command is delayed and/or reordered. Additionally, the command queue threshold may be less than (e.g., at least one less than) a total number of commands that may be stored in a command pipeline associated with the host device such as previously described.

If the controller determines (380) the command completion counter is greater than or equal to the command queue threshold, the controller rejects the received write command and sends (390) a retry request to the host device. However, if the controller determines (380) that the command completion counter is less than the command queue threshold, the controller causes the data associated with the received write command to be provided (330) to the write cache. A deadlock condition has been avoided and the method 300 may proceed such as previously described.

Referring back to operation 320, if the controller determines (320) the LBA of the write command is greater than high_zone (e.g., the write command was received out of sequence), the controller may determine whether a deadlock condition will be triggered if the write command is reordered. In an example, if a deadlock condition will occur when attempting to reorder the write command that was received out of sequence, the controller will reject the received write command and subsequently provide a retry response to the host device.

For example, the controller determines (360) an amount of memory that is required to store all of the data associated with the received write command. The controller also determines an amount of memory that is required to store all of the data associated with any intervening write commands that have been or will be received by the controller (e.g., any write commands that will be received between the received write command and a previously executed write command).

For example, the host device submitted Command A, Command B, Command C and Command D to the controller. However, the Command A was received first, followed by Command D, Command C and Command B. In this example, Command A was sequentially written in the proper location in the memory die. However, when Command D is received, the controller may need to determine whether the write cache has sufficient memory store all of the data associated with Command D, as well as all of the "gap" data (e.g., all of the data associated with Command B and Command C) associated with write commands that fall in sequence after Command A.

In an example, the amount of memory that is required to store all of the data may be based, at least in part, on a size of each memory block in the various zones of the memory die.

For example, the controller may determine that each logical block is n KB and a received command will use m logical blocks. As such, the write cache should have n*m KB of space available in order to store all data associated with the received command and any intervening write command.

Based on the above, the controller determines (370) whether the write cache has sufficient memory to store all of the data associated with the received write command and all of the data associated with any intervening commands that have yet to be received (e.g., write commands that fall in sequence before the received write command). If the controller determines (370) the write cache does not have the necessary memory space, the controller sends (390) a retry response to the host device and rejects the received write command.

However, if the controller determines the write cache has the necessary memory space to store data associated with the received write command, and all data associated with the intervening write commands that fall in sequence before the received write command, the controller determines (380) whether the number of commands in the command queue exceeds a command queue threshold such as previously described.

If the controller determines (380) the command completion counter is greater than or equal to the command queue threshold, the controller rejects the received write command and sends (390) a retry request to the host device. However, if the controller determines (380) that the command completion counter is less than the command queue threshold, the controller causes the data associated with the received write command to be provided (330) to the write cache. A deadlock condition has been avoided and the method 300 may proceed such as previously described.

For example, the controller may determine or otherwise update (340), based at least in part, on an amount of data associated with the received write command, an amount of available space remaining in the write cache. The controller may also determine (350) whether the LBA of the write command is equivalent to a head_zone value such as previously described.

Figure 4:
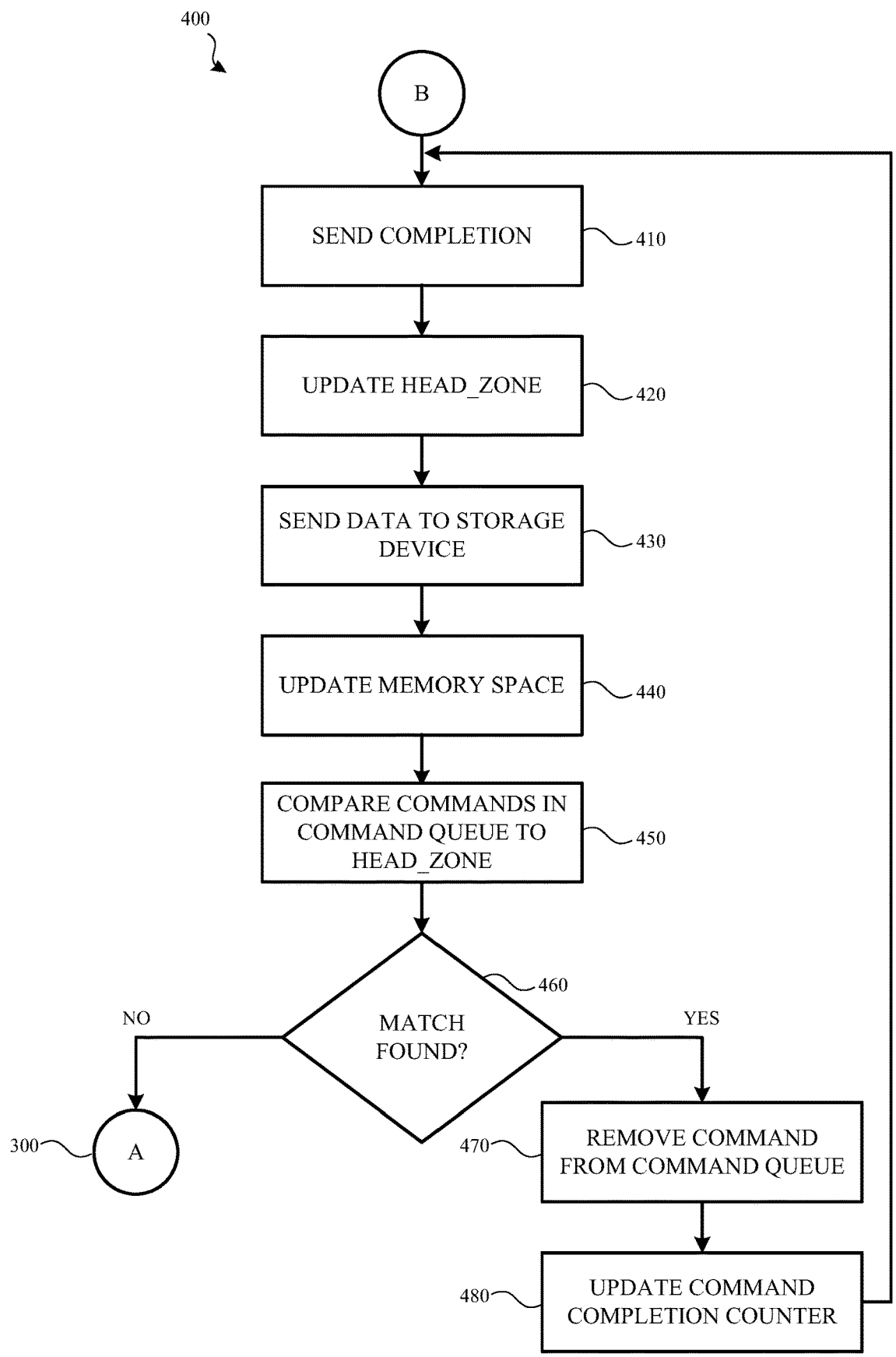
FIG. 4 illustrates a method for fetching data associated with sequential zone storage write commands that have been reordered according to an example.

If the controller determines (350) the LBA of the write command is equivalent to head_zone, the controller executes the method 400 shown and described with respect to FIG. 4. However, if the controller determines (350) the LBA of the write command is not equivalent to head_zone, the controller executes the method 500 shown and described with respect to FIG. 5.

FIG. 4 illustrates a method 400 for fetching data associated with sequential zone storage write commands that have been reordered according to an example. In an example, the method 400 may also be performed when a sequential zone storage write command is received in an expected sequence. Additionally, the method 400 may be executed or otherwise performed by a controller, such as, for example, controller 200 (FIG. 2) and/or by one or more subsystems of the controller 200.

In an example, when the controller determines the LBA of the received write command is equivalent to head_zone, the controller sends (410) a command completion message to the host device. The command completion message may indicate that a particular received command was successfully executed/completed.

The controller may also update the value of head_zone. In an example, the value of head_zone is updated based, at least in part, on a size of the write command that was successfully executed. The controller may then send (430) data that is stored in write cache to a storage device. When the data associated with received write command (and/or any other data stored in the write cache) has been provided to the storage device, the controller updates (440) and/or determines an amount of memory that is available in the write cache.

The controller also compares (450) commands in the command queue to the head_zone to determine whether additional completion messages may be transmitted to the host device and/or whether data associated with received commands can be written in the write cache. For example, the controller determines whether an LBA of a previously received write command, that was received out of sequence and stored in the command queue, matches the updated value of head_zone.

If the controller finds (460) a match, the controller removes (470) that particular write command from the command queue and decrements or updates (480) the command completion counter such as previously described. The method 400 may be completed any number of additional times based, at least in part, on the number and/or sequence of commands in the command queue. However, if a match is not found (460), the method 400 ends and method 300 may begin for another received write command.

Figure 5:
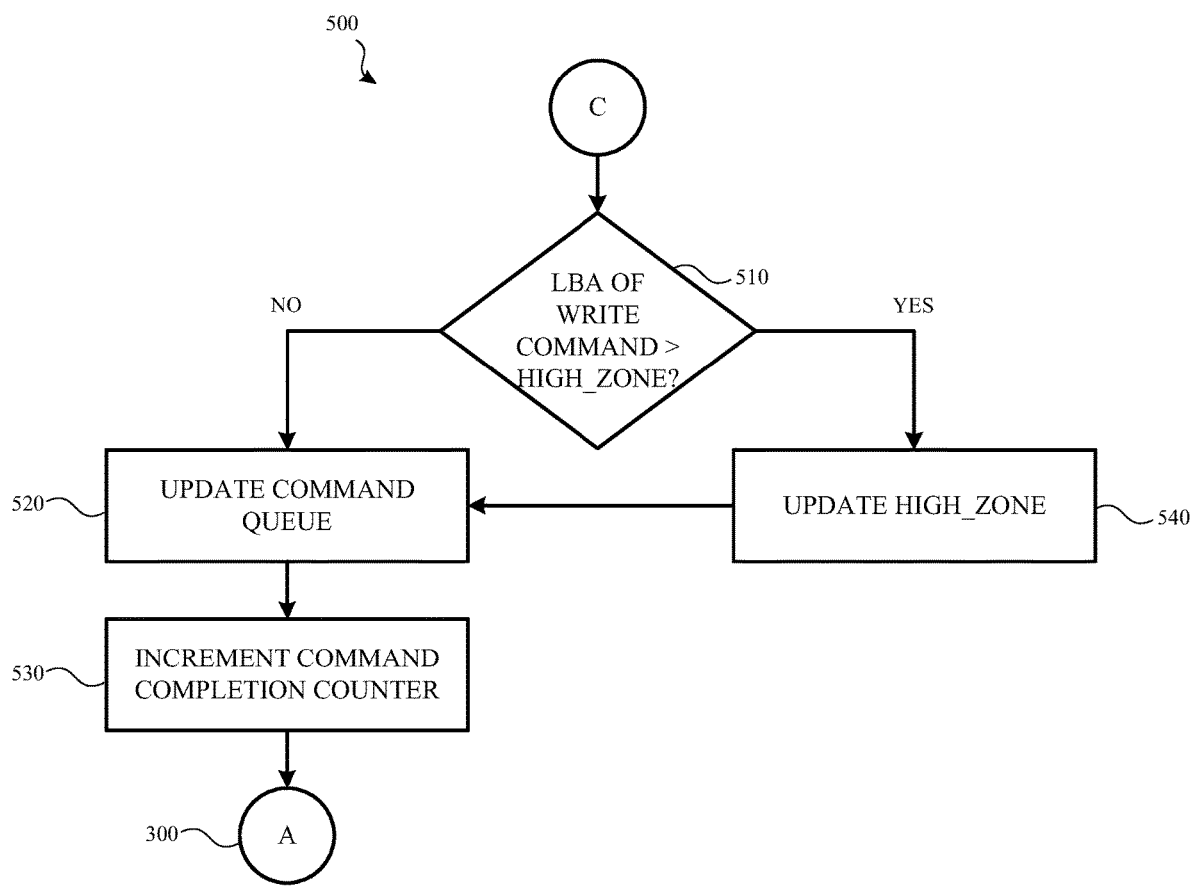
FIG. 5 illustrates a method for updating a command queue that stores information associated with reordered sequential zone write storage commands according to an example.

FIG. 5 illustrates a method 500 for updating a command queue that stores information associated with reordered sequential zone write storage commands according to an example. The method 500 may be executed or otherwise performed by a controller, such as, for example, the controller 200 (FIG. 2) and/or by one or more subsystems of the controller 200. In an example, the method 500 is executed based, at least in part, on a determination (350) (FIG. 3) that a LBA of a received write command is not equivalent to the value in head_zone.

For example, and once the controller determines that the LBA of a received command is not equivalent to the value in head_zone, the controller may need to update the command queue and/or the command completion counter. In order to update the command queue and the command completion counter, the controller compares the LBA of the write command to high_zone. The controller uses this comparison to determine (510) whether the LBA of the received write command is greater than the value for high_zone.

If it is determined (510) that the LBA of the received command is less than the value for high_zone, the controller updates (520) the command queue by pushing or otherwise storing the received write command in the command queue. Additionally, the controller increments (530) the command completion counter. Method 300 may then begin for another received write command.

However, if it is determined (510) that the LBA of the received command is greater than the value for high_zone, the controller updates (540) the value for high_zone. In an example, the value of high_zone is updated based, at least in part, on the LBA of the received write command, plus the size of the command minus one. The controller may then update (520) the command queue and/or increment (530) the command completion counter such as previously described.

Figure 6:
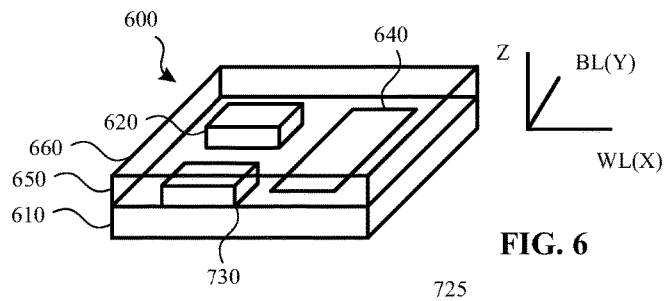
FIG. 6 is a perspective view of a storage device that includes three-dimensional (3D) stacked non-volatile memory according to an example.
Figure 7:
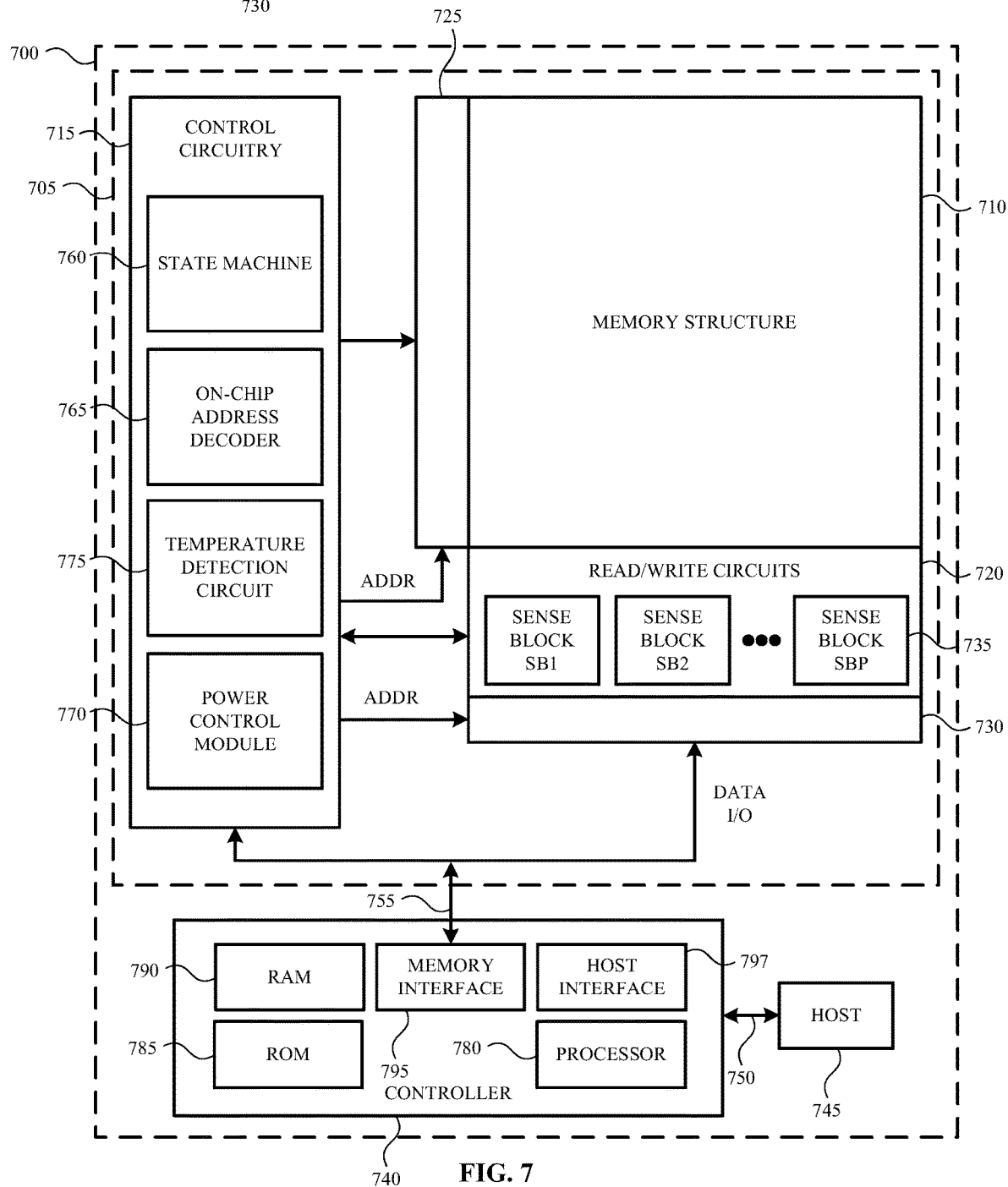
FIG. 7 is a block diagram of a storage device according to an example.

FIG. 6-FIG. 7 describe example storage devices that may be used with or otherwise implement the various features described herein. For example, the storage devices shown and described with respect to FIG. 6-FIG. 7 may include various systems and components that are similar to the systems and components shown and described with respect to FIG. 1. For example, the controller 740 shown and described with respect to FIG. 7 may be similar to the controller 150 of FIG. 1. Likewise, the memory dies 705 may be part of the memory device 155 of FIG. 1.

FIG. 6 is a perspective view of a storage device 600 that includes three-dimensional (3D) stacked non-volatile memory according to an example. In this example, the storage device 600 includes a substrate 610. Blocks of memory cells are included on or above the substrate 610. The blocks may include a first block (BLK0 620) and a second block (BLK1 630). Each block may be formed of memory cells (e.g., non-volatile memory elements). The substrate 610 may also include a peripheral area 640 having support circuits that are used by the first block and the second block.

The substrate 610 may also carry circuits under the blocks, along with one or more lower metal layers which are patterned in conductive paths to carry signals from the circuits. The blocks may be formed in an intermediate region 650 of the storage device 600. The storage device may also include an upper region 660. The upper region 660 may include one or more upper metal layers that are patterned in conductive paths to carry signals from the circuits. Each block of memory cells may include a stacked area of memory cells. In an example, alternating levels of the stack represent word lines. While two blocks are depicted, additional blocks may be used and extend in the x-direction and/or the y-direction.

In an example, a length of a plane of the substrate 610 in the x-direction represents a direction in which signal paths for word lines or control gate lines extend (e.g., a word line or drain-end select gate (SGD) line direction) and the width of the plane of the substrate 610 in the y-direction represents a direction in which signal paths for bit lines extend (e.g., a bit line direction). The z-direction represents a height of the storage device 600.

FIG. 7 is a functional block diagram of a storage device 700 according to an example. In an example, the storage device 700 may be the 3D stacked non-volatile storage device 600 shown and described with respect to FIG. 6. The components depicted in FIG. 7 may be electrical circuits. In an example, the storage device 700 includes one or more memory dies 705. Each memory die 705 includes a three-dimensional memory structure 710 of memory cells (e.g., a 3D array of memory cells), control circuitry 715, and read/write circuits 720. In another example, a two-dimensional array of memory cells may be used. The memory structure 710 is addressable by word lines using a first decoder 725 (e.g., a row decoder) and by bit lines using a second decoder 730 (e.g., a column decoder). The read/write circuits 720 may also include multiple sense blocks 735 including SB1, SB2, . . . , SBp (e.g., sensing circuitry) which allow pages of the memory cells to be read or programmed in parallel. The sense blocks 735 may include bit line drivers.

In an example, a controller 740 is included in the same storage device 700 as the one or more memory dies 705. In another example, the controller 740 is formed on a die that is bonded to a memory die 705, in which case each memory die 705 may have its own controller 740. In yet another example, a controller die controls all of the memory dies 705.

Commands and data may be transferred between a host 745 and the controller 740 using a data bus 750. Commands and data may also be transferred between the controller 740 and one or more of the memory dies 705 by way of lines 755. In one example, the memory die 705 includes a set of input and/or output (I/O) pins that connect to lines 755.

The memory structure 710 may also include one or more arrays of memory cells. The memory cells may be arranged in a three-dimensional array or a two-dimensional array. The memory structure 710 may include any type of non-volatile memory that is formed on one or more physical levels of arrays of memory cells having an active area disposed above a silicon substrate. The memory structure 710 may be in a non-volatile memory device having circuitry associated with the operation of the memory cells, whether the associated circuitry is above or within the substrate.

The control circuitry 715 works in conjunction with the read/write circuits 720 to perform memory operations (e.g., erase, program, read, and others) on the memory structure 710. The control circuitry 715 may include registers, ROM fuses, and other devices for storing default values such as base voltages and other parameters.

The control circuitry 715 may also include a state machine 760, an on-chip address decoder 765, a power control module 770 and a temperature detection circuit 775. The state machine 760 may provide chip-level control of various memory operations. The state machine 760 may be programmable by software. In another example, the state machine 760 does not use software and is completely implemented in hardware (e.g., electrical circuits).

The on-chip address decoder 765 may provide an address interface between addresses used by host 745 and/or the controller 740 to a hardware address used by the first decoder 725 and the second decoder 730.

The power control module 770 may control power and voltages that are supplied to the word lines and bit lines during memory operations. The power control module 770 may include drivers for word line layers in a 3D configuration, select transistors (e.g., SGS and SGD transistors) and source lines. The power control module 770 may include one or more charge pumps for creating voltages.

The control circuitry 715 may also include a temperature detection circuit 775. The temperature detection circuit may be configured to detect a temperature of one or more components of the memory device 700.

The control circuitry 715, the state machine 760, the on-chip address decoder 765, the first decoder 725, the second decoder 730, the temperature detection circuit 775, the power control module 770, the sense blocks 735, the read/write circuits 720, and/or the controller 740 may be considered one or more control circuits and/or a managing circuit that perform some or all of the operations described herein.

In an example, the controller 740, is an electrical circuit that may be on-chip or off-chip. Additionally, the controller 740 may include one or more processors 780, ROM 785, RAM 790, memory interface 795, and host interface 797, all of which may be interconnected. In an example, the one or more processors 780 is one example of a control circuit. Other examples can use state machines or other custom circuits designed to perform one or more functions. Devices such as ROM 785 and RAM 790 may include code such as a set of instructions. One or more of the processors 780 may be operable to execute the set of instructions to provide some or all of the functionality described herein.

Alternatively or additionally, one or more of the processors 780 may access code from a memory device in the memory structure 710, such as a reserved area of memory cells connected to one or more word lines. The memory interface 795, in communication with ROM 785, RAM 790, and one or more of the processors 780, may be an electrical circuit that provides an electrical interface between the controller 740 and the memory die 705. For example, the memory interface 795 may change the format or timing of signals, provide a buffer, isolate from surges, latch I/O, and so forth.

The one or more processors 780 may issue commands to control circuitry 715, or any other component of memory die 705, using the memory interface 795. The host interface 797, in communication with the ROM 785, the RAM 795, and the one or more processors 780, may be an electrical circuit that provides an electrical interface between the controller 740 and the host 745. For example, the host interface 797 may change the format or timing of signals, provide a buffer, isolate from surges, latch I/O, and so on. Commands and data from the host 745 are received by the controller 740 by way of the host interface 797. Data sent to the host 745 may be transmitted using the data bus 750.

Multiple memory elements in the memory structure 710 may be configured so that they are connected in series or so that each element is individually accessible. By way of a non-limiting example, flash memory devices in a NAND configuration (e.g., NAND flash memory) typically contain memory elements connected in series. A NAND string is an example of a set of series-connected memory cells and select gate transistors.

The memory cells may be arranged in the single memory device level in an ordered array, such as in a plurality of rows and/or columns. However, the memory elements may be arrayed in non-regular or non-orthogonal configurations, or in structures not considered arrays.

Some three-dimensional memory arrays are arranged so that memory cells occupy multiple planes or multiple memory device levels, thereby forming a structure in three dimensions (e.g., in the x, y, and z directions, where the z direction is substantially perpendicular and the x and y directions are substantially parallel to the major surface of the substrate).

As a non-limiting example, a 3D memory structure may be vertically arranged as a stack of multiple 2D memory device levels. As another non-limiting example, a 3D memory array may be arranged as multiple vertical columns (e.g., columns extending substantially perpendicular to the major surface of the substrate, such as in the y direction) with each column having multiple memory cells. The vertical columns may be arranged in a two-dimensional arrangement of memory cells, with memory cells on multiple vertically stacked memory planes. Other configurations of memory elements in three dimensions can also constitute a 3D memory array.

By way of non-limiting examples, in a 3D NAND memory array, the memory elements may be coupled together to form vertical NAND strings that traverse across multiple horizontal memory device levels. Other 3D configurations can be envisioned wherein some NAND strings contain memory elements in a single memory level while other strings contain memory elements which span through multiple memory levels. 3D memory arrays may also be designed in a NOR configuration and in a ReRAM configuration.

One of ordinary skill in the art will recognize that the technology described herein is not limited to a single specific memory structure, but covers many relevant memory structures within the spirit and scope of the technology as described herein and as understood by one of ordinary skill in the art.

Accordingly, examples of the present disclosure describe a method, comprising: receiving, from a host device, a sequential zone storage write command; determining, based at least in part, on a logical block address (LBA) associated with the sequential storage write command, whether the sequential zone storage write command was received in sequence with respect to a previously received sequential zone storage write command; and based, at least in part, on determining the sequential zone storage write command was received out of sequence with respect to the previously received sequential zone storage write command: determining an amount of memory needed to store data associated with the sequential zone storage write command and an amount of memory needed to store data associated with one or more intervening sequential zone storage write commands, the one or more intervening sequential zone storage write commands falling in sequence between the sequential storage write command and the previously received sequential zone storage write command; determining whether a write cache has sufficient memory to store the amount of data associated with the sequential zone storage write command and the amount of data associated with the one or more intervening sequential zone storage write commands; based, at least in part, on determining the write cache has sufficient memory, determining whether a command completion counter is less than a command queue threshold; based, at least in part, on determining the command completion counter is less than the command queue threshold, causing the data associated with the sequential zone storage write command to be stored in the write cache. In an example, causing the data associated with the sequential zone storage write command to be stored in the write cache comprises causing the data associated with the sequential zone storage write command to be stored at a particular location within the write cache. In an example, the particular location is associated with the LBA of the sequential zone storage write command. In an example, the method also includes updating an available amount of memory of the write cache. In an example, the method also includes sending a command completion message to the host device based, at least in part, on the data associated with the sequential zone storage write command being stored in the write cache. In an example, the method also includes sending a re-try response to the host device based, at least in part, on determining the write cache has insufficient memory to store the amount of data associated with the sequential zone storage write command and the amount of data associated with the one or more intervening sequential zone storage write commands. In an example, the method also includes sending a re-try response to the host device based, at least in part, on determining the command completion counter is greater than the command queue threshold. In an example, the method also includes determining whether the LBA associated with the sequential storage write command is equivalent to a zone write pointer associated with a zone of a memory device; and based, at least in part, on determining the LBA associated with the sequential storage write command is equivalent to the zone write pointer associated with the zone of the memory device, sending a command completion indication to the host device. In an example, the method also includes updating the zone write pointer based, at least in part, on a command size of the sequential storage write command. In an example, the method also includes determining whether an LBA of a sequential storage write command stored in a command queue is equivalent to the updated zone write pointer. In an example, the method also includes retrieving data associated with the sequential storage write command stored in the command queue; and causing the data associated with the sequential storage write command stored in the command queue to be written to the memory device. In an example, the method also includes causing the data in the write cache to be written to the memory device. In an example, the method also includes updating an available amount of memory of the write cache based, at least in part, on a command size of the sequential storage write command.

The present application also describes a system, comprising: a controller; a sequential write required storage device; and a memory communicatively coupled to the controller and storing instructions that, when executed by the controller, cause the controller to: determine, based at least in part, on a logical block address (LBA) associated with a received sequential zone storage write command, whether the sequential zone storage write command was received in sequence with respect to a previously received sequential zone storage write command; and based, at least in part, on a determination that the sequential zone storage write command was received out of sequence with respect to the previously received sequential zone storage write command: determine whether a write cache has sufficient memory to store a determined amount of data associated with the sequential zone storage write command and a determined amount of data associated with one or more intervening sequential zone storage write commands; based, at least in part, on determining the write cache has sufficient memory, determine whether a command completion counter is less than a command queue threshold; and based, at least in part, on determining the command completion counter is less than the command queue threshold, causing the data associated with the sequential zone storage write command to be stored in the write cache. In an example, the data associated with the sequential zone storage write command to be stored in write cache comprises causing the data associated with the sequential zone storage write command to be stored at a location that is associated with the LBA of the sequential zone storage write command. In an example, the instructions also include instructions for updating an available amount of memory of the write cache. In an example, the instructions also include instructions for sending a re-try response to a host device based, at least in part, on a determination that the write cache has insufficient memory to store the amount of data associated with the sequential zone storage write command and the amount of data associated with the one or more intervening sequential zone storage write commands. In an example, the instructions also include instructions for sending a re-try response to a host device based, at least in part, on a determination that the command completion counter is greater than the command queue threshold. In an example, the instructions also include instructions for: determining whether the LBA associated with the sequential storage write command is equivalent to a zone write pointer associated with a zone of the sequential write required storage device; and based, at least in part, on determining the LBA associated with the sequential storage write command is equivalent to the zone write pointer associated with the zone of the sequential write required storage device, sending a command completion indication to a host device.

In an example, the present application also describes a system, comprising: a controller means; a sequential write required storage means; means for determining whether a sequential zone storage write command was received in sequence with respect to a previously received sequential zone storage write command; and based, at least in part, on a determination that the sequential zone storage write command was received out of sequence with respect to the previously received sequential zone storage write command: means for determining whether a write cache has an amount of memory to store a determined amount of data associated with the sequential zone storage write command and a determined amount of data associated with one or more intervening sequential zone storage write commands; means for determining whether a command completion counter is less than a command queue threshold; and means for causing the data associated with the sequential zone storage write command to be stored in the write cache based, at least in part, on determining the command completion counter is less than the command queue threshold and based, at least in part, on determining the write cache has sufficient memory.

The term computer-readable media as used herein may include computer storage media. Computer storage media may include volatile and nonvolatile, removable and non-removable media implemented in any method or technology for storage of information, such as computer readable instructions, data structures, or program modules. Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by a computing device (e.g., host device 105 (FIG. 1)). Any such computer storage media may be part of the computing device. Computer storage media does not include a carrier wave or other propagated or modulated data signal.

Additionally, examples described herein may be discussed in the general context of computer-executable instructions residing on some form of computer-readable storage medium, such as program modules, executed by one or more computers or other devices. By way of example, and not limitation, computer-readable storage media may comprise non-transitory computer storage media and communication media. Generally, program modules include routines, programs, objects, components, data structures, etc., that perform particular tasks or implement particular abstract data types. The functionality of the program modules may be combined or distributed as desired in various examples.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

The description and illustration of one or more aspects provided in the present disclosure are not intended to limit or restrict the scope of the disclosure in any way. The aspects, examples, and details provided in this disclosure are considered sufficient to convey possession and enable others to make and use the best mode of claimed disclosure.

The claimed disclosure should not be construed as being limited to any aspect, example, or detail provided in this disclosure. Regardless of whether shown and described in combination or separately, the various features (both structural and methodological) are intended to be selectively rearranged, included or omitted to produce an embodiment with a particular set of features. Having been provided with the description and illustration of the present application, one skilled in the art may envision variations, modifications, and alternate aspects falling within the spirit of the broader aspects of the general inventive concept embodied in this application that do not depart from the broader scope of the claimed disclosure.

Aspects of the present disclosure have been described above with reference to schematic flowchart diagrams and/or schematic block diagrams of methods, apparatuses, systems, and computer program products according to embodiments of the disclosure. It will be understood that each block of the schematic flowchart diagrams and/or schematic block diagrams, and combinations of blocks in the schematic flowchart diagrams and/or schematic block diagrams, can be implemented by computer program instructions. These computer program instructions may be provided to a processor of a computer or other programmable data processing apparatus to produce a machine, such that the instructions, which execute via the processor or other programmable data processing apparatus, create means for implementing the functions and/or acts specified in the schematic flowchart diagrams and/or schematic block diagrams block or blocks. Additionally, it is contemplated that the flowcharts and/or aspects of the flowcharts may be combined and/or performed in any order.

References to an element herein using a designation such as "first," "second," and so forth does not generally limit the quantity or order of those elements. Rather, these designations may be used as a method of distinguishing between two or more elements or instances of an element. Thus, reference to first and second elements does not mean that only two elements may be used or that the first element precedes the second element. Additionally, unless otherwise stated, a set of elements may include one or more elements.

Terminology in the form of "at least one of A, B, or C" or "A, B, C, or any combination thereof" used in the description or the claims means "A or B or C or any combination of these elements." For example, this terminology may include A, or B, or C, or A and B, or A and C, or A and B and C, or 2A, or 2B, or 2C, or 2A and B, and so on. As an additional example, "at least one of: A, B, or C" is intended to cover A, B, C, A-B, A-C. B-C, and A-B-C, as well as multiples of the same members. Likewise, "at least one of: A, B, and C" is intended to cover A, B, C, A-B, A-C. B-C, and A-B-C, as well as multiples of the same members.

Similarly, as used herein, a phrase referring to a list of items linked with "and/or" refers to any combination of the items. As an example, "A and/or B" is intended to cover A alone, B alone, or A and B together. As another example, "A, B and/or C" is intended to cover A alone, B alone. C alone. A and B together. A and C together. B and C together, or A. B. and C together.

What is claimed is:

1. A method, comprising:
   receiving, from a host device, a sequential zone storage write command;
   determining, based at least in part, on a logical block address (LBA) associated with the sequential storage write command, whether the sequential zone storage write command was received in sequence with respect to a previously received sequential zone storage write command; and
   based, at least in part, on determining the sequential zone storage write command was received out of sequence with respect to the previously received sequential zone storage write command:
   determining an amount of memory needed to store data associated with the sequential zone storage write command and an amount of memory needed to store data associated with one or more intervening sequential zone storage write commands, the one or more intervening sequential zone storage write commands falling in sequence between the sequential storage write command and the previously received sequential zone storage write command;
   determining whether a write cache has sufficient memory to store the amount of data associated with the sequential zone storage write command and the amount of data associated with the one or more intervening sequential zone storage write commands;

based, at least in part, on determining the write cache has sufficient memory, determining whether a command completion counter is less than a command queue threshold;

based, at least in part, on determining the command completion counter is less than the command queue threshold, causing the data associated with the sequential zone storage write command to be stored in the write cache.

2. The method of claim 1, wherein causing the data associated with the sequential zone storage write command to be stored in the write cache comprises causing the data associated with the sequential zone storage write command to be stored at a particular location within the write cache.

3. The method of claim 2, wherein the particular location is associated with the LBA of the sequential zone storage write command.

4. The method of claim 1, further comprising updating an available amount of memory of the write cache.

5. The method of claim 1, further comprising sending a command completion message to the host device based, at least in part, on the data associated with the sequential zone storage write command being stored in the write cache.

6. The method of claim 1, further comprising sending a re-try response to the host device based, at least in part, on determining the write cache has insufficient memory to store the amount of data associated with the sequential zone storage write command and the amount of data associated with the one or more intervening sequential zone storage write commands.

7. The method of claim 1, further comprising sending a re-try response to the host device based, at least in part, on determining the command completion counter is greater than the command queue threshold.

8. The method of claim 1, further comprising:
determining whether the LBA associated with the sequential storage write command is equivalent to a zone write pointer associated with a zone of a memory device; and
based, at least in part, on determining the LBA associated with the sequential storage write command is equivalent to the zone write pointer associated with the zone of the memory device, sending a command completion indication to the host device.

9. The method of claim 8, further comprising updating the zone write pointer based, at least in part, on a command size of the sequential storage write command.

10. The method of claim 9, further comprising determining whether an LBA of a sequential storage write command stored in a command queue is equivalent to the updated zone write pointer.

11. The method of claim 10, further comprising:
retrieving data associated with the sequential storage write command stored in the command queue; and
causing the data associated with the sequential storage write command stored in the command queue to be written to the memory device.

12. The method of claim 8, further comprising causing the data in the write cache to be written to the memory device.

13. The method of claim 7, further comprising updating an available amount of memory of the write cache based, at least in part, on a command size of the sequential storage write command.

14. A system, comprising:
a controller;
a sequential write required storage device; and
a memory communicatively coupled to the controller and storing instructions that, when executed by the controller, cause the controller to:
determine, based at least in part, on a logical block address (LBA) associated with a received sequential zone storage write command, whether the sequential zone storage write command was received in sequence with respect to a previously received sequential zone storage write command; and
based, at least in part, on a determination that the sequential zone storage write command was received out of sequence with respect to the previously received sequential zone storage write command:
determine whether a write cache has sufficient memory to store a determined amount of data associated with the sequential zone storage write command and a determined amount of data associated with one or more intervening sequential zone storage write commands;
based, at least in part, on determining the write cache has sufficient memory, determine whether a command completion counter is less than a command queue threshold; and
based, at least in part, on determining the command completion counter is less than the command queue threshold, causing the data associated with the sequential zone storage write command to be stored in the write cache.

15. The system of claim 14, wherein causing the data associated with the sequential zone storage write command to be stored in write cache comprises causing the data associated with the sequential zone storage write command to be stored at a location that is associated with the LBA of the sequential zone storage write command.

16. The system of claim 14, further comprising instructions for updating an available amount of memory of the write cache.

17. The system of claim 14, further comprising instructions for sending a re-try response to a host device based, at least in part, on a determination that the write cache has insufficient memory to store the amount of data associated with the sequential zone storage write command and the amount of data associated with the one or more intervening sequential zone storage write commands.

18. The system of claim 14, further comprising instructions for sending a re-try response to a host device based, at least in part, on a determination that the command completion counter is greater than the command queue threshold.

19. The system of claim 14, further comprising instructions for:
determining whether the LBA associated with the sequential storage write command is equivalent to a zone write pointer associated with a zone of the sequential write required storage device; and
based, at least in part, on determining the LBA associated with the sequential storage write command is equivalent to the zone write pointer associated with the zone of the sequential write required storage device, sending a command completion indication to a host device.

20. A system, comprising:
a controller means;
a sequential write required storage means;
means for determining whether a sequential zone storage write command was received in sequence with respect to a previously received sequential zone storage write command; and based, at least in part, on a determination that the sequential zone storage write command was received out of sequence with respect to the previously received sequential zone storage write command:
means for determining whether a write cache has an amount of memory to store a determined amount of data associated with the sequential zone storage write command and a determined amount of data associated with one or more intervening sequential zone storage write commands;
means for determining whether a command completion counter is less than a command queue threshold; and
means for causing the data associated with the sequential zone storage write command to be stored in the write cache based, at least in part, on determining the command completion counter is less than the command queue threshold and based, at least in part, on determining the write cache has sufficient memory.

* * * * *